C. R. McNEIL.
MUSICAL INSTRUCTION CHART.
APPLICATION FILED NOV. 18, 1918.

1,338,236.

Patented Apr. 27, 1920.

INVENTOR
Charles R. McNeil
BY
Edward S. Beach
ATTORNEY

UNITED STATES PATENT OFFICE.

CHARLES RANSOM McNEIL, OF NEW YORK, N. Y.

MUSICAL-INSTRUCTION CHART.

1,338,236.   Specification of Letters Patent.   Patented Apr. 27, 1920.

Application filed November 18, 1918. Serial No. 262,936.

*To all whom it may concern:*

Be it known that I, CHARLES RANSOM MC-NEIL, a citizen of the United States, residing in the city, county, and State of New York, have invented certain new and useful Improvements in Musical-Instruction Charts, of which the following is a specification.

This invention relates to a chart consisting of a sheet of paper, or other suitable material on which is drawn or printed a representation of the musical staff, a certain guiding framework of vertical and horizontal lines, and certain musical indicia representing the instrumental fingerings, and the names of the notes of the musical scale, in such a way that said instrumental fingerings and said names are graphically correlated with the symbols representing the notes of the musical scale in written music, by means of the lines of the staff.

The object of the chart is to instruct students of music: as to the proper manipulation of various musical instruments; as to the relation, one to another, of the several musical scales; and as to the reading and instrumental interpretation of written music.

The chart in its theory and general form is applicable to any musical instrument, the manipulation of which is capable of graphic representation. Among the instruments for which it is particularly useful are, the flute (common or Boehm system), piccolo, fife, clarinet, flageolet, bassoon, oboe, bagpipes, and in general all those wind instruments the notes of which are produced by the opening and closing of holes, either by the fingers or by keys.

The accompanying illustration of a chart for the D flute with eight keys is to be regarded as a sample, representative of a series of similar charts for various instruments, other than the D flute with eight keys.

In the accompanying sheet of drawings which forms a part of this application,

Figure 1 is a representation of the chart proper in its entirety, and is linked together by the lines of the staff, visible or produced, into one tonal composition, all parts of which are governed by said lines of the staff. The word "entirety" as used above is to be construed as meaning its entirety with reference to a chart for the D flute with eight keys; and not as excluding the introduction into the chart of a different portion of the musical staff and of different musical indicia to adapt it to other instruments.

Fig. 2 is a drawing of the working parts of the instrument for which the chart is intended, together with explanatory notes and other data for the benefit of the student, all of which are necessary adjuncts to the chart in its commercial form, but which have no direct bearing on the points of originality herein claimed.

In the drawings, $l$ indicates the main lines of the musical staff or staff proper; $l'$ the leger lines of the musical staff; $m$ Arabic numerals denoting relative order of leger lines $l'$; $b$ a bracket used to bind together lines of staff proper; $k$ a clef, a conventional symbol used in music to define pitch of the staff; $v$ vertical lines (peculiar to this chart) crossing staff lines at right angles; $v'$, $v^2$ similar vertical lines; $h$ horizontal lines associated with verticals $v$; $h'$, similar horizontal lines; $p$ parallelograms formed by lines $v$ and $h$; $p'$ similar parallelograms; $c'$, $c^2$, $c^3$, $c^4$ columns of parallelograms $p$ and $p'$; $n$ names of natural notes of the musical scale; $n^s$ names of sharp notes of the musical scale; $n^t$ names of flat notes of the musical scale; $f$ compound symbols in common use to represent the fingering of the notes of the musical scale on some particular instrument; and $e$ explanatory data which are integral parts of the chart, but which have no direct bearing on the points of originality claimed.

The new features of this invention are:

First. In a chart of the character described, a certain framework of vertical and horizontal lines inclosing between them a number of parallelograms, said frame work of lines being superposed on a representation of the conventional musical staff in such a manner as to identify in graphic altitude each one of said parallelograms with a certain line or a certain space of the staff. The purpose of said lines and parallelograms is to inclose and delimit certain groups of musical indicia which are later to be placed within them, and to establish the relation of tonal identity between the note represented by the indicia within any one parallelogram and the note represented by that line or space of the staff which is graphically associated in altitude with that parallelogram.

The musical staff consists of five main lines $l$ called the lines of the staff proper, and of an indefinite number of secondary lines $l'$, called leger lines, both above and below the staff proper. They are parallel and uniformly spaced. The lines of the staff proper are bound together by the brackets $b$, and there is placed upon them a musical symbol $k$ called the clef, which determines the tonal position of the particular staff represented, with reference to the entire range of musical notes.

The staff represented in Fig. 1 is the treble staff, and there may be in addition to it, another called the bass staff (not shown) which is used to represent music written for some instruments of low pitch. Each line, and each space between the lines, of the staff represents by musical convention a certain note, and these notes are arranged in consecutive order in an ascending series. For example, referring to Fig. 1, the line at the bottom of the staff proper represents E; the space above the first line F; the second line G; the space above the second line A; the third line B; and so on.

The function of the staff is to distinguish the different notes from one another in written music, the written symbols for the notes being indistinguishable otherwise. When one of these symbols is written on one of the lines, or on one of the spaces, of the staff, it is understood to mean that particular note which, as above explained, is represented by that line or by that space.

The main lines $l$, and the leger lines $l'$ of the musical staff are assumed to be produced, in the mathematical sense of that word, indefinitely, with the result that toward the left of the chart the tonal control of said lines is extended to include the portion of the chart designated "complete scale for all keys"; and toward the right it is extended to include any additional "separate scales for different keys" which it may be desirable to add to the chart.

The vertical lines $v$, $v'$, $v^2$ are drawn crossing the visible or produced staff lines $l$, $l'$, at right angles; and between any two of them, taken as a pair, is drawn a series of horizontal lines $h$ or $h'$, dividing the space between the two verticals into a number of parallelograms $p$, $p'$, which are arranged in columns $c'$, $c^2$, $c^3$, $c^4$. In this connection, the line $v'$ is to be considered as a continuous line, and as forming the right-hand boundary of column $c'$, and the left-hand boundary of column $c^2$; and the dotted vertical line $u$ is to be disregarded, it representing merely the dividing line on the instrument between the left and right hands.

The horizontal lines $h$, exclusive of $h'$, are uniformly spaced one half as far apart in the vertical direction as the lines of the staff $l$, $l'$, and are so located with respect to them that the horizontal axis of every second, or alternate parallelogram $p$ coincides with one of the lines of the staff, and the horizontal axes of the intervening parallelograms are equidistant between two of the lines of the staff.

This may be otherwise stated as follows: The parallelograms $p$ are coaxial in alternate order with the lines of the staff and with the spaces between the lines of the staff.

This same relation is to be assumed to exist with respect to the parallelograms $p'$, notwithstanding that in actual graphic representation their axes lie half way between a line and the axis of a space of the staff, for the reason that in written music the symbols for the notes associated with those particular parallelograms have a variable position on the written staff.

It would be possible instead of such parallelograms as are described above, to employ some other geometric figure or some form of vinculum or bracket for the same purpose; it is therefore asked that the word "parallellogram" be interpreted broadly enough to include any such geometric figure, vinculum or bracket.

Second. In a chart of the character described, the graphic representation thereon of a certain class of musical indicia described below, illustrative of the manipulation, or fingering of certain musical instruments, in the production of the notes of the musical scale, either with or without a certain other class of musical indicia described below illustrative of the names of the said notes, in such a manner that the said musical indicia shall be placed upon those certain lines or those certain spaces of the musical staff, and graphically shown on said chart, which by musical convention are understood to represent the particular notes corresponding with said indicia, each to each; whether a framework of lines and parallelograms be employed or not employed as an aid in defining and delimiting the locus and coaxial relation, as to the lines and spaces of the staff, of said indicia.

The purpose of this method of representing the said musical indicia is, thereby to indicate a relation of representative tonal identity between them and the written symbols (neumes) of the notes as they occur on the corresponding lines or spaces of the staff, in written or sheet music.

In the case of any one of the indicia within the parallelograms $p'$, represented in column $c'$ on the drawing of sharp and flat notes, and lying halfway between a line and the axis of a space of the staff, the above-described relation of tonal indentity is to be construed to apply to the line or axis of a space of the staff lying immediately above it when the chart is applied to music written in a flat key; and to the line or axis of a space of the staff lying immediately below it when the chart is applied to music written in a sharp key; and they, the indicia, are so represented in the separate scales for different keys.

The description of the above-mentioned musical indicia is as follows.

The first-mentioned class are those which are in common use among musicians to represent in an explanatory and directive way the proper manipulation, or fingering, of the parts of the particular instrument to which the chart relates, in order to produce by means of said instrument the various notes of the musical scale. They may consist of a single indicium or of a group of indicia, and when in a group, the group is taken as a whole to produce some single note. They are in fact miniature pictures or diagrams of the instrument itself conventionalized. They vary with different instruments, and their individual description has no pertinence to the claims of originality herein made. They are designated on the drawing by the general index letter $f$.

The second mentioned class are the letters of the alphabet A, B, C, D, E, F, G, commonly used as names for the musical notes. When standing alone they are the names of the natural notes and are designated by the general index letter $n$. When associated with the sharp sign (#) they are the names of the sharp notes and are designated by the general index letter $n^s$. When associated with the flat sign (♭) they are the names of the flat notes and are designated by the general index letter $n^f$. Both flat and sharp names are in some situations applied to one and the same note.

Third. A third feature of the invention relates exclusively to the "complete scale for all keys," shown on the drawing. Fig. 1, at the left of the central clef symbol, and involves a chart of the character described with the graphic representation of the fingerings on some musical instrument, for the seven primary notes of the musical scale in the key of C (natural scale) in consecutive order in a column, the fingering for each of said seven notes being superposed on, or otherwise brought into graphic coaxial relation with its proper line or space of the musical staff, visible or produced; and in connection therewith, the fingerings for the five accidental notes in the key of C (sharp and flat notes), so arranged in point of locus that the fingering for each one of said accidental notes occupies a position intermediate between the fingerings for the two primary notes to which it is tonally related, analogously to the relative position of the notes themselves in the chromatic scale, but at the same time being differentiated or separated from the fingerings for the primary notes by being placed in a distinct, but adjacent column, or separated in some other manner so as not to interrupt the continuity of the succession of the primary notes, otherwise called the diatonic scale in the key of C.

The purpose of this method of representation is in the first place to present the fingerings for the notes of the complete chromatic scale in a normal, scientific, serviceable, easily understood and compact form; in the second place to help the student to understand the relation between the chromatic scale and the several diatonic scales in different keys, and how and why the scales in different keys are formed; also, the nature and importance of the key note of each scale as the starting point for the symmetrical order of recurrence of the tone and semitone intervals which gives musical quality to each scale; in short, to introduce into the study of other instruments a certain clarity, which up to the present time has been peculiar to the piano and similar instruments on account of the normal and rational arrangement of the white and black keys on their keyboards, this arrangement being essentially identical with that now introduced into this chart.

The chromatic scale consists of a continuous and unbroken succession of all the notes which are used in music from the lowest to the highest. The intervals between these notes are called semitones, and the interval from one of them to the second one above it is called a tone.

A continuous succession of semitone intervals is not pleasing to the ear, and therefore other scales having a pleasing musical quality are formed by selecting some of the notes of the chromatic scale and omitting others, in a certain established order. Such scales are known as diatonic scales, and may start on any note whatever, that note being called the key note of that particular scale. Counting from the key note, the second, fourth, seventh, ninth and eleventh notes of the chromatic scale are dropped out, and the seven remaining notes, in any one octave, are called primary notes, and the five omitted notes are called accidentals because they are occasionally, but not regularly used. Each note of the chromatic scale occurs as a primary note in some keys and as an accidental in others.

All written music is expressed in terms of the diatonic scales; so, to avoid confusion and to establish a single system of nomenclature which shall apply to all the different keys, the scale starting with C as a key note has been adopted as the basic, or "natural" scale, and its seven primary notes are designated by the letters of the alphabet C, D, E, F, G, A, B and its five accidentals are differentiated by calling each of them the sharp of the primary note immediately below it; or the flat of the primary note immediately above it.

When it occurs in music written in a sharp key, the sharp name is used and the symbol for it is written on the line or space of the staff belonging to the note below it, of which it is the sharp; conversely when it occurs in music in a flat key the flat name is used and the symbol for it is written on the line or space of the staff belonging to the note above it, of which it is the flat.

Each of these five notes, which are otherwise exactly similar to the rest of the notes, has heretofore two different names, and two different places on the staff. This is a difficult thing for the student to understand, and something which cannot be clearly and graphically illustrated on the charts of instruction which are now in use, although it is of the utmost importance in musical practice.

Fourth. Another feature of the invention relates exclusively to the "complete scale for all keys" shown on the drawing, Fig. 1, at the left of the central clef symbols.

The resemblance to the keyboard of the piano might at first be thought to be only a necessary sequence of what has been above described, but in fact a chart might easily be constructed in several different ways so as to embody all the features and advantages described and yet bear no outward resemblance to the keyboard of the piano, and the advantages claimed to result from this resemblance could not be derived from any feature of this chart previously described.

In a chart of the character described there is printed or drawn a representation having a clear and obvious resemblance, both in general form and in component parts, to the keyboard of the musical instrument known as the piano, and consisting of certain lines and included parallelograms identical with those described; also of certain indicia representing the fingerings on some musical instruments for, and the names of, the notes of the musical scale, graphically identified with the lines and spaces of the musical staff, in the manner described; also of such an arrangement of the indicia representing the natural notes of the musical scale and the sharp and flat notes of said scale as shall bring the indicia representing the said two classes of notes into a relation one to the other analogous to the relation of the notes represented by said indicia, to the notes of the chromatic scale on the one hand, and to the notes of the diatonic scale in the key of C on the other hand, in the manner described; the whole being superposed upon a representation of the musical staff; and also having each indicium or each group of indicia representing a certain note graphically associated with that one of the several parallelograms of the chart which corresponds graphically with that key of the piano which when struck produces the said certain note.

The purpose of the above-described resemblance of the chart to the keyboard of the piano, considered separately from the other characteristics of the chart, is in the first place to enable the inexperienced student to identify the notes of his instrument with the corresponding notes of the piano, in order to tune his instrument with the piano, or to accompany another person playing upon the piano; in the second place, to enable the more advanced student to directly apply the knowledge of the scales, which he has acquired on the piano, to some other instrument.

Finally it is to be noted that the novel characteristics of the described chart constitute a kind of mechanical means for the use of the user of the chart when playing a given instrument, as physical guide means in making his mental determination of what parts of the instrument he is playing are to be employed.

But the vertical and horizontal rulings which divide the chart into parallelograms may be omitted if preferred.

I claim,—

1. As a new article of manufacture, an instruction chart for use in playing musical instruments, said chart having a series of horizontal spaces severally printed with indicia indicating how to place the fingers on the instrument to produce a certain note, and also printed with visible adjacent indicia indicative of the name of said note; said chart being also printed with a representation of the musical staff which is located on the chart with its lines and spaces severally in horizontal alinement with a horizontal alinement of the fingering indicia and the indicia indicating the name of the note which in written music is printed on such staff line or space; some of the fingering indicia being on the horizontal lines of the musical staff, and others being on the axes of the spaces between said musical-staff lines.

2. As a new article of manufacture, an instruction chart for use in playing musical instruments, said chart having a series of horizontal spaces severally printed with indicia indicating how to place the fingers on the instrument to produce a certain note, and also printed with visible adjacent indicia indicative of the name of said note; said chart being also printed with a representation of the musical staff which is located on the chart with its lines and spaces severally in horizontal alinement with a horizontal alinement of the fingering indicia and the indicia indicating the name of the note which in written music is printed on such staff line or space; the chart being also printed in visible relation to the aforesaid indicia and staff lines and spaces diagrammatically to represent such a portion of the keyboard of a piano as embraces the compass of said instrument; some of the fingering indicia being on the horizontal lines of the musical staff, and others being on the axes of the spaces between said musical-staff lines.

3. As a new article of manufacture, an instruction chart for use in playing musical instruments, said chart having graphically outlined spaces, one of which contains fingering indicia for flats and sharps, and two others of which contain fingering indicia for the natural notes related to said sharps and flats, the latter two spaces being horizontal and one above the other, and one end of the space for the sharps and flats, fingering indicia being opposed to an end of said two spaces in horizontal relation thereto; some of the fingering indicia being on the horizontal lines of the musical staff, and others being on the axes of the spaces between said musical-staff lines.

4. As a new article of manufacture, an instruction chart for use in playing musical instruments, said chart having a representation of the musical staff and having on the horizontal lines of the staff indicia for fingering an instrument to produce the particular note represented by the staff line; and also having between horizontal staff lines other indicia for fingering the instrument to produce the particular note represented by such space; some of the fingering indicia being on the horizontal lines of the musical staff, and others being on the axes of the spaces between said musical-staff lines.

In testimony whereof I have hereunto set my hand this 16th day of November, 1918.

CHARLES RANSOM McNEIL.